June 17, 1952  W. S. TORRENCE  2,600,939
BACKLASH STOPPER FOR FISHING REELS
Filed March 13, 1950
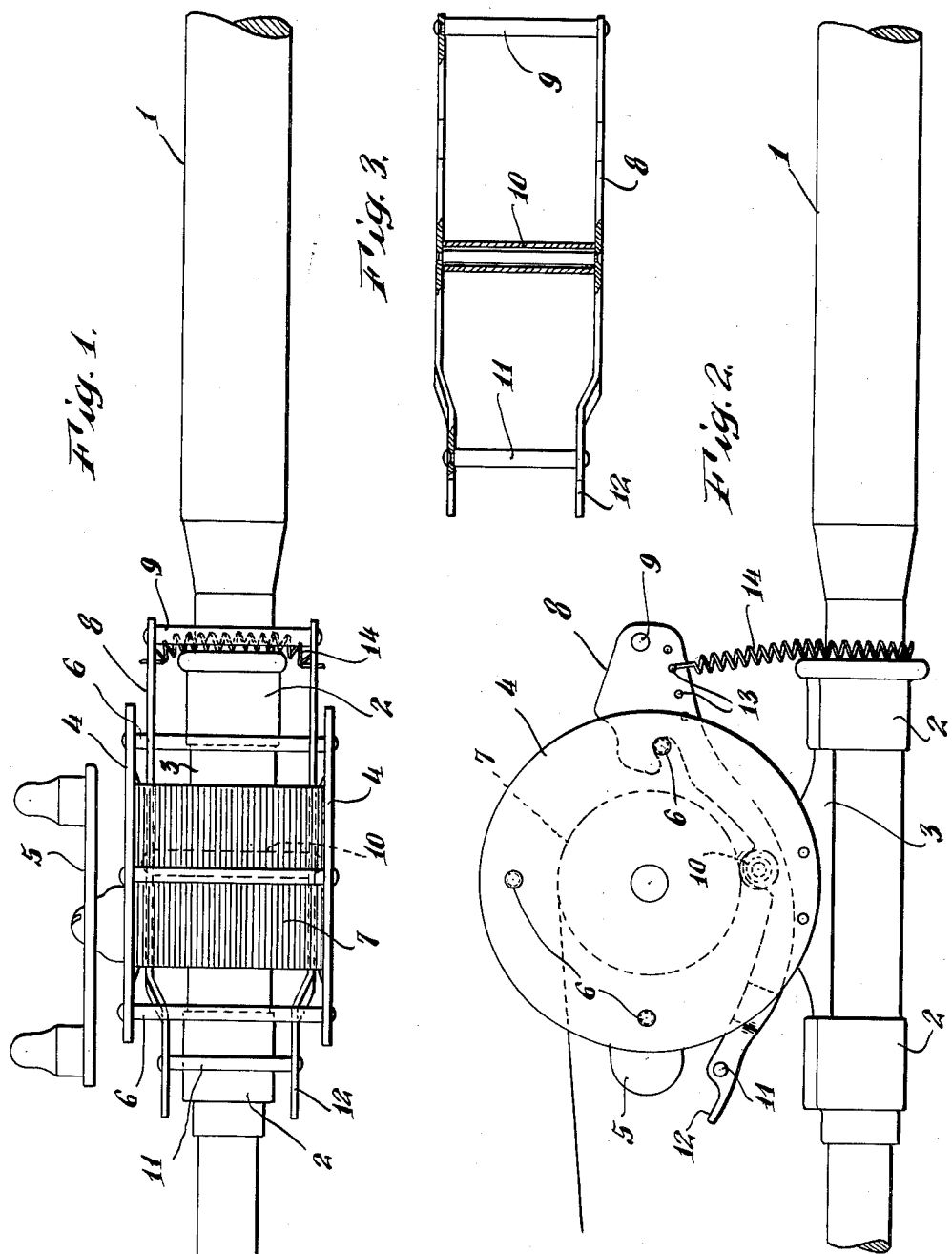
INVENTOR.
Walter S. Torrence
BY Henry J. E. Metzler
Attorney Patented June 17, 1952

2,600,939

UNITED STATES PATENT OFFICE 2,600,939

BACKLASH STOPPER FOR FISHING REELS

Walter S. Torrence, San Antonio, Tex.

Application March 13, 1950, Serial No. 149,247

1 Claim. (Cl. 242—84.5)

The present invention relates to improvements in fishing reels and, more specifically, to a new and improved back lash stopper for the fishing line.

It happens frequently that, during the casting of a fishing line, the sinker or plug at the end of the line causes temporarily an extensive pulling force, so that the spool of the fishing reel revolves at a high speed. Due to the inertia of the spool, the speed of the spool will not be reduced instantly if said pulling force is reduced, so that the line will be wound back partially upon the spool in the wrong direction because the spool temporarily revolves faster than is necessary for unwinding the line which passes through the guides on the fishing rod. This causes a tangling up of the line, causing time consuming, bothersome efforts to untangle it. Controlling the speed of the spool during the casting process by a fisherman holding his thumb against the line on the spool is objectionable because it results in burns or other injuries of the thumb while the thumb thus is being used as a brake.

In order to overcome these shortcomings and to save fishermen from spending time and effort on the untangling of the line, one object of the present invention is the provision of a device of the character described when in a very simple and efficient manner permits to control the speed of the spool by exerting thereupon a braking action without touching any revolving parts or the line with the fingers.

Another object of the present invention is the provision of a device of the character described which is adjustable, so that it will cause different degrees of tension upon the fishing line according to the weight of the plugs or sinkers used in different waters and for different kinds of fishing; and which automatically will reduce the tension of the line as the line is running off the spool during the cast.

Still another object of the present invention is the provision of a device of the character described which can be built into new reels while they are being manufactured, and which also can be attached to ordinary reels that are in use already, and which further can be detached from the reel easily and quickly, and can be re-attached again, without the use of any tools and without the application of any considerable amount of skill.

A further object of the present invention is the provision of a device of the character described which will not interfere with the re-winding of the fishing line or with any other operation of the fishing reel, which is light in weight, simple in construction and inexpensive to manufacture, but which is also sturdy, durable and well adapted to withstand the rough usage to which devices of this type frequently are subjected.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

In the accompanying drawing a preferred form of the invention has been shown.

In said drawing:

Figure 1 is a top view of a fishing reel provided with a preferred embodiment of my invention;

Fig. 2 is a side elevation of the same; and

Fig. 3 is a top view of the embodiment of my invention without the fishing reel.

Similar reference characters refer to similar parts throughout the several views.

In the drawing the numeral 1 denotes a portion of a fishing rod having sleeve members 2, which engage the base 3 of a fishing reel that has a pair of spaced spool walls 4, a crank handle 5, cross rods 6 and a fishing line 7. The parts 1 to 7 inclusive may be made of any approved shape or design, and they form no part of my present invention.

My invention relates only to my new and improved back lash stopper (Fig. 3), which consists of a pair of curved bars 8, a first cross member 9, a roller 10 and a second cross member 11. Each of the bars 8, which may be made of steel, brass, aluminum, plastic material, or the like, has an arch-shaped main portion, a hook-shaped portion at the end of said main portion and an outwardly from said hook-shaped portion extending perforated end portion. The cross members 9 and 11 connect the ends of one bar 8 to the ends of the other bar 8, and keep the bars 8 in spaced relation to each other at such a distance that they can be inserted between the spool walls 4. The hook-shaped portion at one end of the main portion of each bar 8 is adapted for detachably and pivotally engaging a cross rod 6 of the reel, as may be seen in Fig. 2. The roller 10 is rotatably mounted on the center sections of the bars 8, which center sections preferably are shaped as upwardly extending lug portions, so that the roller 10 will rest against the line 7 wound upon the spool of the reel.

A row of perforations 13 is provided in each bar 8 at that end portion which extends outwardly from said hook-shaped portion. Each end of the spring 14, which passes around the rod 1, or any other suitable resilient means, is inserted in one of the perforations 13 of each bar 8, so as to tend to force the device in a clockwise direction around the cross rod 6 of the reel, which cross rod 6 is engaged by said hook-shaped portions of the bars 8. Thus the spring 14 always presses the roller 10 upon the line 7 on the reel, and the pressure of the roller 10 against the line 7 can be adjusted in the following manner: In order to increase this pressure, and thus increase the braking force, the spring 14 is hooked into those perforations 13 which are close to the cross member 9; in order to reduce said pressure the ends of the spring 14 are hooked into perforations 13 which are close to said hook-shaped portions of the bars 8. While the line 7 is being unwound from the reel—during the casting process—the roller 10 moves toward the center of the spool as the line 7 is running off the spool, and the perforations 13 move toward the rod 1, so that the tension of the spring 14 is decreased gradually, and the pressure of the roller 10 upon the line 7 also is decreased gradually, thus automatically reducing the tension of the line 7 as the line 7 is running off the reel.

The braking action of the roller 10 can be increased by pressing the cross member 9 toward the rod 1, which a fisherman can do easily with his thumb when he starts the cast; then, during the cast, he takes his thumb off the member 9.

If my new and improved back lash stopper is permanently secured to the reel, the bars 8 can be hinged or pivoted permanently to the cross rod 6 by any suitable means, instead of being detachably secured thereto by means of said hook-shaped portion. The bars 8 also can be made shorter than in the instance shown. For example, they can terminate immediately after the lug portions in which the roller 10 is carried rotatably; in this case the cross member 11 can be omitted. If the bars 8 are extended beyond the roller 10 as shown, I prefer to reduce the outer end portions 12 of the bars 8 as shown.

Since certain changes may be made in the above article and different embodiments of the invention could be made without departing from the scope thereof, it is intended that all matter contained in the above description or shown in the accompanying drawing shall be interpreted as illustrative and not in a limiting sense.

Having thus fully described my said invention, what I claim as new and desire to secure by Letters Patent in the United States is:

A device of the character described comprising a pair of bars each of which has an arch-shaped main portion, a hook-shaped portion at the end of the main portion and a perforated end portion extending from said hook-shaped portion and being angularly disposed thereto at an obtuse angle; cross members connecting each end of one bar to the ends of the other bar and holding the bars in spaced relation at a distance which is smaller than the distance between the walls of a fishing reel; a roller crosswise extended between and secured to the main portions of said bars; and a spring having its ends connected to the perforated end portions of said bars and being adapted to be laid around a fishing rod; the hook-shaped portions of said bars being adapted for pivotally and detachably engaging a cross rod of the fishing reel.

WALTER S. TORRENCE.

REFERENCES CITED

The following references are of record in the file of this patent:

UNITED STATES PATENTS

| Number | Name | Date |
| --- | --- | --- |
| 506,094 | Boardman | Oct. 3, 1893 |
| 2,257,521 | Babcock | Sept. 30, 1941 |